Aug. 17, 1965 F. T. SHERK 3,201,492
SEPARATION OF HYDROCARBONS POSSESSING VOLATILITY DIFFERENCES
Filed Jan. 2, 1962
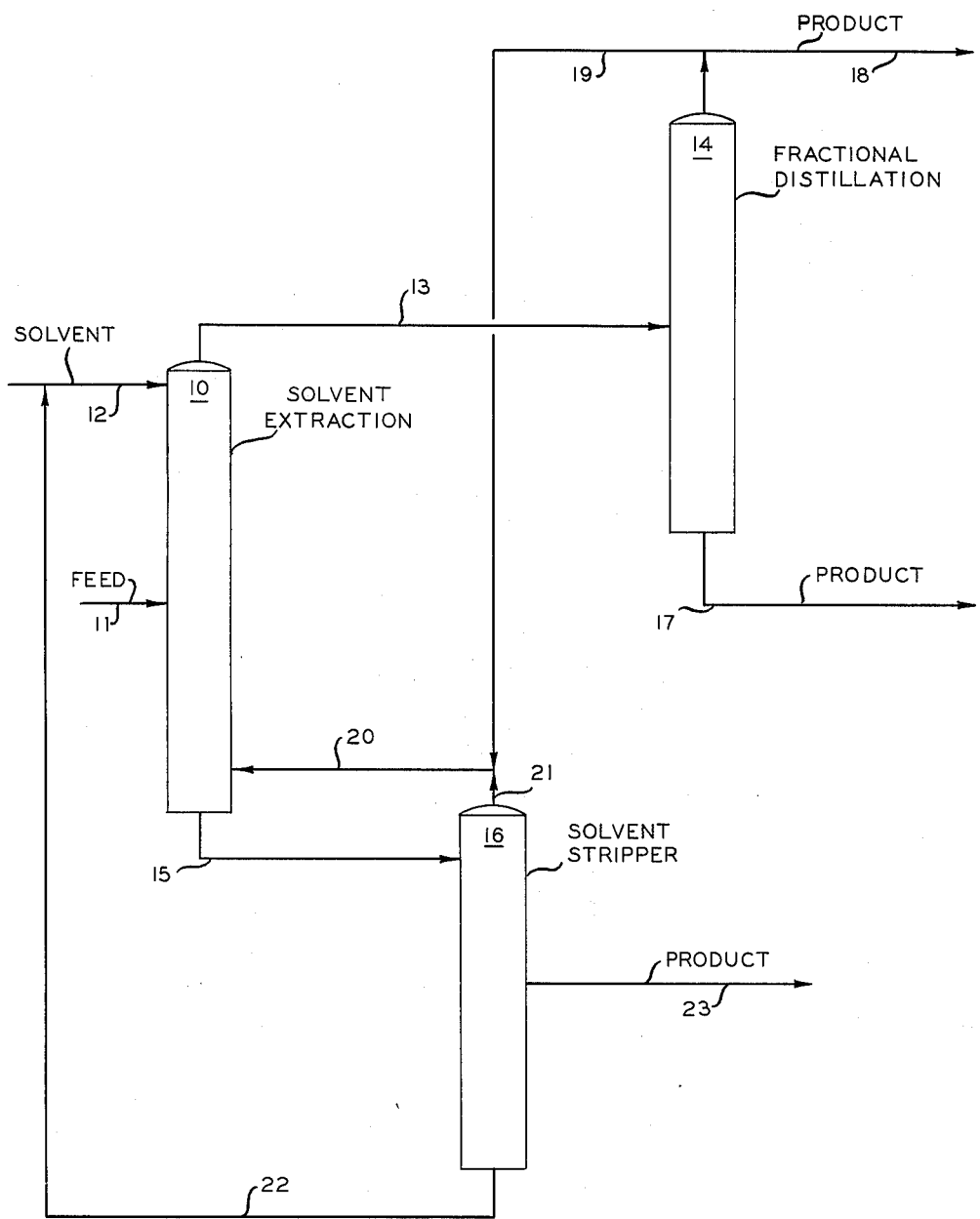
INVENTOR.
F. T. SHERK
BY *Young & Quigg*
ATTORNEYS 3,201,492
SEPARATION OF HYDROCARBONS POSSESSING VOLATILITY DIFFERENCES
Fred T. Sherk, Bartlesville, Okla., assignor to Phillips Petroleum Company, a corporation of Delaware
Filed Jan. 2, 1962, Ser. No. 163,469
5 Claims. (Cl. 260—681.5)

This invention relates to an improved process for the separation of organic mixtures. In one specific aspect, this invention relates to the separation of an intermediate fraction from a mixture of hydrocarbons.

In a conventional separation of, for example, isoprene from a mixture comprising isoprene, 3-methylbutene-1, 2-methylbutene-1 and 2-methylbutene-2 said mixture is passed to a solvent extraction zone wherein isoprene is separated from the mixture. This conventional separation process requires large volumes of solvent to effectively extract the isoprene and recover a high purity isoprene product from the rich solvent withdrawn from said extraction zone.

Accordingly, an object of my invention is to provide an improved organic separation process.

Another object of my invention is to provide an improved process for separating a hydrocarbon fraction from a mixture of hydrocarbons wherein said hydrocarbon fraction has a volatility intermediate of the remainder of said hydrocarbon mixture.

Another object of my invention is to provide an improved process for separating by solvent extraction an organic fraction from an organic mixture wherein said organic fraction has a volatility intermediate of the remainder of said organic mixture.

Another object of my invention is to provide an improved process for separating by solvent extraction a hydrocarbon fraction from a mixture of hydrocarbons wherein said hydrocarbon fraction has a volatility intermediate of the remainder of said hydrocarbon mixture.

Other objects, advantages and features of my invention will be readily apparent, from the following description and the appended claims, to those skilled in the art.

Broadly, I have discovered an improved process for the separation of an organic fraction from an organic mixture, said organic fraction capable of being solvent extracted from said organic mixture and having a volatility intermediate of the remainder of said organic mixture, wherein said organic mixture is contacted with a selective solvent in a solvent extraction zone; a raffinate stream withdrawn from said extraction zone is separated by fractional distillation and at least a portion of the most volatile fraction recycled as reflux to the extraction zone; an extract stream withdrawn from said extraction zone is solvent stripped in a stripping zone and the most volatile fraction recycled to said extraction zone; the solvent withdrawn from the stripping zone is recycled to the extraction zone; and said intermediate fraction is recovered as a product from the solvent stripping of said extract stream.

The inventive separation process is applicable to the separation of an organic fraction from an organic mixture wherein said organic fraction due to its physical or chemical structure is capable of solvent extraction from said mixture by a selective solvent and whose volatility is intermediate that of the remaining constituents of said organic mixture.

Solvent extraction as herein employed includes liquid-liquid extraction and extractive distillation.

The inventive separation process is particularly applicable to the separation of a hydrocarbon fraction from a mixture comprising two or more hydrocarbons wherein said hydrocarbon fraction due to its physical or chemical structure is capable of extraction from said mixture by a selective solvent and whose volatility is intermediate that of the remaining constituents of said mixture of hydrocarbons. The inventive separation process is more specifically applicable to the separation of isoprene from a mixture containing isoamylenes and isoprene and to the separation of butadiene from a mixture comprising propylene, butadiene and butylenes.

The drawing is a schematic representation of the inventive separation process.

The inventive separation process shall hereinafter be described in detail as applied to the separation of isoprene from a mixture comprising isoprene and isoamylenes, said isoamylenes comprising 3-methylbutene-1, 2-methylbutene-1, and 2-methylbutene-2. It is not intended to limit the inventive separation process to the separation of isoprene as the principles disclosed herein are applicable to the separation of other organic mixtures.

Referring to the drawing, a hydrocarbon mixture comprising isoprene and isoamylenes is passed via conduit means 11 to a solvent extraction vessel 10. The feed mixture can, for example, be obtained from the dehydrogenation of isoamylenes. A selective solvent such as furfural or methyl Carbitol, a trade name for diethylene glycol monomethyl ether, is passed via conduit means 12 to solvent extraction vessel 10.

An overhead product stream comprising 3-methylbutene-1, 2-methylbutene-1 and 2-methylbutene-2 is withdrawn from solvent extraction vessel 10 via conduit means 13 and passed as feedstock to a fractional distillation vessel 14. A bottoms product stream comprising solvent, isoprene and 3-methylbutene-1 is withdrawn from solvent extraction vessel 10 via conduit means 15 and passed as feed to a solvent stripping vessel 16.

An overhead product stream comprising 3-methylbutene-1 is withdrawn from fractional distillation vessel 14 via conduit means 18. A portion of the overhead product stream withdrawn from fractional distillation vessel 14 is recycled via conduit means 19 and conduit means 20 to solvent extraction vessel 10 as reflux. A bottoms product stream comprising 2-methylbutene-1 and 2-methylbutene-2 is withdrawn from fractional distillation vessel 14 via conduit means 17.

An overhead reflux stream comprising isoprene, methyl Carbitol and 3-methylbutene-1 is withdrawn from solvent stripping vessel 16 via conduit means 21 and recycled as reflux via conduit means 20 to solvent extraction vessel 10. A bottoms product stream comprising solvent is withdrawn from solvent stripping vessel 16 via conduit means 22 and recycled as solvent feed to solvent extraction vessel 10 via conduit means 12. A sidedraw product isoprene stream is withdrawn from solvent stripping vessel 16 via conduit means 23.

It is within the scope of this invention to further process the isoprene product stream to extract any solvent contained therein by, for example, passing the product stream as a feed to a third fractional distillation vessel not herein illustrated. From said third fractional distillation vessel, an isoprene product stream and a solvent product stream would be withdrawn.

It is also within the scope of this invention to extract any solvent contained in the raffinate stream withdrawn from solvent extraction vessel 10 via conduit means 13 by, for example, water washing the raffinate stream.

It is, of course, within the scope of this invention to provide means, not herein illustrated, of heating and cooling the feed streams, product streams and vessels. Such conventional means of controlling the temperature of the process streams and process zones are within the skill of the art.

With a hydrocarbon feed stream to solvent extraction vessel 10 comprising butadiene, propylene and butylenes, an overhead propylene and butylenes containing stream would be withdrawn from solvent extraction vessel 10 and passed to fractional distillation vessel 14. A bottoms product solvent, butadiene, butylenes and propylene containing stream is withdrawn from solvent extraction vessel 10 and passed via conduit means 15 to solvent stripper vessel 16.

An overhead propylene containing stream is withdrawn from fractional distillation vessel 14, a portion of said overhead product stream recycled as reflux via conduit means 19 and 20 to solvent extraction vessel 10. A bottoms product butylenes containing stream is withdrawn from fractional distillation vessel 14 via conduit means 17.

An overhead butadiene, propylene and butylenes containing stream is withdrawn from solvent stripper vessel 16 via conduit means 21 and recycled as reflux via conduit means 20 to solvent extraction vessel 10. As in the case of the isoprene separation process, a solvent stream is withdrawn from solvent stripper vessel 16 via conduit means 22 and recycled via conduit means 12 to solvent extraction vessel 10. A butadiene product stream is withdrawn from solvent stripper vessel 16 via conduit means 23. As in the case of the isoprene separation process, it is within the scope of this invention to further process the butadiene product stream to separate any solvent contained in said product stream by, for example, water washing the product stream.

In the separation of isoprene from a mixture comprising isoprene, 3-methylbutene-1, 2-methylbutene-1, and 2-methylbutene-2 by the inventive separation process, the ratio of solvent to feed conventionally required in the solvent extraction of isoprene from said mixture is reduced in the range of about 20 percent. This represents a substantial increase in efficiency over conventional solvent extraction processes.

With the employment of the inventive separation process to separate butadiene from a feed stream comprising propylene, butylenes and butadiene, an advantage over conventional separation processes is that a separate separation zone is not required to remove the propylene fraction prior to the solvent extraction of the butadiene fraction. Another advantage of the inventive separation process is that the solvent extraction zone need not be operated so as to produce a solvent containing hydrocarbon stream wherein the butadiene content of the hydrocarbon fraction is of the desired purity. For example, if a butadiene product stream of 99.0 volume percent purity is desired, a conventional solvent extraction zone must be operated so as to produce a solvent containing hydrocarbon stream wherein the percent purity of the butadiene of the hydrocarbon fraction is 99.0 percent. The inventive separation process can be operated so as to produce a solvent containing hydrocarbon stream wherein the percent purity of butadiene is in the range from 70 to 80 percent, for example, and yet a butadiene product of 99.0 percent purity will be obtained. Therefore, in reducing the necessary efficiency of the solvent extraction zone the required solvent to hydrocarbon feed ratio is substantially reduced at least 10–20 volume percent less solvent required than conventionally required.

A more comprehensive understanding of the inventive separation process can be obtained by referring to the following detailed description of the separation of isoprene from a mixture comprising isoprene, 3-methylbutene-1, 2-methylbutene-1, and 2-methylbutene-2.

A hydrocarbon feed mixture comprising 5.6 weight percent 3-methylbutene-1, 19.9 weight percent 2-methylbutene-1, 38.4 weight percent isoprene, 28.2 weight percent 2-methylbutene-2 and 7.9 weight percent normal pentenes is passed via conduit 11 to solvent extraction vessel 10 at the rate of 14,200 lbs./hr. Methyl Carbitol containing 12 weight percent water is passed via conduit 12 to solvent extraction vessel 10 at a rate so as to maintain the weight ratio of methyl Carbitol to hydrocarbon feed at 26.6 to 1. The temperature and pressure of the solvent extraction vessel 10 is maintained at 200° F. and at 130 p.s.i.a., respectively.

An overhead raffinate stream containing 3-methylbutene-1, 2-methylbutene-1, 2-methylbutene-2, normal pentenes, and a trace of isoprene is passed via conduit means 13 to fractional distillation vessel 14. The composition and rate of flow of the raffinate and other process streams are listed in Table I. A 3-methylbutene-1 product stream having the composition of Table I is withdrawn from fractional distillation vessel 14 via conduit 18 at the rate of 707 lbs./hr. A 3-methylbutene-1 stream having the composition of Table I is withdrawn from fractional distillation via conduit means 19, recycled via conduit means 19 and 20 as reflux solvent extraction vessel 10 at the rate of 808 lbs./hr. A bottoms product stream with the composition of Table I is withdrawn from fractional distillation vessel 14 via conduit 17 at the rate of 8067 lbs./hr.

TABLE I

Composition

| Conduit | Isoprene, lbs./hr. | 3-Methyl-butene-1, lbs./hr. | 2-Methyl-butene-1, lbs./hr. | 2-Methyl-butene-2, lbs./hr. | Normal Pentenes, lbs./hr. | Solvent, lbs./hr. |
|---|---|---|---|---|---|---|
| 11 | 5,450 | 800 | 2,830 | 4,000 | 1,120 | |
| 13 | 60 | 1,596 | 2,824 | 3,982 | 1,120 | |
| 15 | 74,351 | 8,410 | 2,171 | 2,975 | 882 | 382,722 |
| 17 | 60 | 96 | 2,809 | 3,982 | 1,120 | |
| 18 | | 709 | 7 | | | |
| 19 | | 800 | 8 | | | |
| 20 | 68,961 | 9,206 | 2,165 | 2,957 | 882 | 4,209 |
| 21 | 68,961 | 8,406 | 2,157 | 2,957 | 882 | 4,209 |
| 22 | | | | | | 378,513 |
| 23 | 5,390 | 4 | 14 | 18 | | |

A bottoms product stream having the composition of Table I is withdrawn from solvent extraction vessel 10 via conduit 15 and passed to solvent stripper vessel 16 at the rate of 471,511 lbs./hr. An overhead product stream having the composition of Table I is withdrawn from solvent stripper vessel 16 via conduit means 21 and recycled via conduit means 20 to solvent extraction vessel 10 at a rate of 87,572 lbs./hr. so that the total reflux to solvent extraction vessel 20 is 88,380 lbs./hr. A vaporous isoprene product stream is withdrawn from the fractional distillation vessel 16 via conduit means 23 at the rate of 5,426 lbs./hr., said product having the composition of Table I. Methyl Carbitol is withdrawn from fractional distillation vessel 16 via conduit means 22 and recycled via conduit means 12 to solvent extraction vessel 10 at the rate of 378,513 lbs./hr.

In order to demonstrate the effectiveness of the inventive separation process, the following example typifying a conventional isoprene solvent extraction process is presented.

EXAMPLE

A hydrocarbon feed stream comprising 5.6 weight percent 3-methylbutene-1, 19.9 weight percent 2-methylbutene-1, 38.4 weight percent isoprene, 28.2 weight percent 2-methylbutene-2, and 7.9 weight percent normal pentenes is passed to a solvent extraction vessel maintained at a temperature of 200° F. and a pressure of 130 p.s.i.a. at the rate of 14,200 lbs./hr. Methyl Carbitol, containing 12 weight percent water, is passed to said solvent extraction vessel, countercurrently contacting said hydrocarbon feed, at a rate so as to maintain a solvent to hydrocarbon feed weight ratio at 33.7 to 1. An overhead product stream is withdrawn from the top of the solvent extraction vessel at the rate of 8,774 lbs./hr., said overhead product stream comprising 16.7 weight percent 3-methylbutene-1, 29.5 weight percent 2-methylbutene-1, 41.6 weight percent 2-methylbutene-2, and 7.9 weight percent normal pentenes. An extract product stream at the rate of 598,390 lbs./hr. comprising 82.9 weight percent solvent and 16.1 weight percent isoprene is withdrawn and passed to solvent stripper vessel where a solvent extraction reflux stream is produced and an overhead product stream. The reflux stream comprises 114,200 lbs./hr. of isoprene, 85 lbs./hr. of 3-methylbutene-1, 297 lbs./hr. of 2-methylbutene-1, and 382 lbs./hr. of 2-methylbutene-2. An isoprene product stream comprising 5,390 lbs./hr. of isoprene, 4 lbs./hr. of 3-methylbutene-1, 14 lbs./hr. of 2-methylbutene-1, and 18 lbs./hr. of 2-methylbutene-2 is withdrawn from the solvent stripper.

The effectiveness of the inventive separation process is clearly demonstrated. Whereas the total feed to the solvent extraction zone comprised 612,590 lbs./hr. in the conventional process, the total feed to the solvent zone of the inventive process comprises 481,093 lbs./hr. to effect the same separation.

The inventive separation process is thus applicable to the solvent extraction of an intermediate fraction of a hydrocarbon mixture. The intermediate hydrocarbon fraction need not be a single constituent but can be multiple constituents capable of being extracted from the hydrocarbon feed. It is also within the scope of this invention to recycle to the solvent extraction zone as reflux from an overhead product separation zone a mixture comprised of multiple constituents.

As will be evident to those skilled in the art, various modifications of this invention can be made, or followed, in the light of the foregoing disclosure and discussion without departing from the spirit or scope thereof.

I claim:

1. A separation process which comprises passing an organic feed mixture to a solvent extraction zone and therein contacting said organic feed, passing a selective solvent to said extraction zone, said selective solvent capable of extracting an intermediate fraction of said organic mixture, said intermediate fraction having a volatility intermediate of the remainder of said organic mixture, passing a raffinate stream from said solvent extraction zone to a fractional distillation zone, withdrawing an overhead product stream having a greater volatility than the volatility of said intermediate fraction from said fractional distillation zone, recycling as reflux a portion of said withdrawn overhead stream to the lower region of said solvent extraction zone, withdrawing from the lower region of said fractional distillation zone a product stream having a volatility less than the volatility of said intermediate fraction, passing a solvent stream containing said intermediate fraction from the lower region of said solvent extraction zone to a solvent stripping zone, withdrawing from said solvent stripping zone a volatile fraction, passing said withdrawn volatile fraction from said solvent stripping zone as reflux to said solvent extraction zone, passing a solvent stream from the lower region of said solvent stripping zone to said solvent extraction zone, and withdrawing from an intermediate region of said solvent stripping zone an intermediate volatile product stream comprising said intermediate fraction.

2. The process of claim 1 wherein said organic mixture comprises isoprene and isoamylenes, said overhead product stream comprises 3-methylbutene-1, said product stream withdrawn from said fractional distillation zone comprises 2-methylbutene-1 and 2-methylbutene-2, said volatile fraction withdrawn from said stripping zone comprises 3-methylbutene-1 and isoprene, and said intermediate fraction comprises isoprene.

3. The process of claim 1 wherein said organic mixture comprises butadiene, propylene and butylenes, said overhead product stream comprises propylene, said product stream withdrawn from said fractional distillation zone comprises butylenes, said volatile fraction withdrawn from said stripping zone comprises propylene and butadiene, and said intermediate fraction comprises butadiene.

4. A process of separating isoprene from a hydrocarbon mixture comprising isoprene and isoamylenes which comprises passing said hydrocarbon stream to a solvent extraction zone, passing diethylene glycol monomethyl ether to said solvent extraction zone, passing a raffinate stream from said solvent extraction zone to a fractional distillation zone, withdrawing from the upper region of said fractional distillation zone a 3-methylbutene-1 containing stream, recycling at least a portion of said overhead withdrawn product stream to said solvent extraction zone as reflux, withdrawing from the lower region of said fractional distillation zone a 2-methylbutene-1 and 2-methylbutene-2 containing stream, passing from the lower region of said solvent extraction zone a diethylene glycol monomethyl ether stream containing isoprene to a solvent stripping zone, withdrawing an overhead stream comprising 3-methylbutene-1, diethylene glycol monomethyl ether and isoprene from said solvent stripping zone, recycling said withdrawn overhead product stream from said solvent stripping zone to said solvent extraction zone as reflux, passing diethylene glycol monomethyl ether from the lower region of said stripping zone to said solvent extraction zone, and withdrawing from an intermediate region of said solvent stripping zone an isoprene product stream.

5. A separation process which comprises passing an organic feed mixture to a solvent extraction zone, passing a selective solvent to said extraction zone and therein contacting said organic feed, said selective solvent capable of extracting an intermediate fraction of said organic mixture, said intermediate fraction having a volatility intermediate of the remainder of said organic mixture, passing a raffinate stream from said solvent extraction zone to a fractional distillation zone, withdrawing an overhead product stream having a greater volatility than the volatility of said intermediate fraction from said fractional distillation zone, recycling as reflux a portion of said withdrawn overhead stream to the lower region of said solvent extraction zone, withdrawing from the lower region of said fractional distillation zone a product stream having a volatility less than the volatility of said intermediate fraction, passing a solvent stream containing said intermediate fraction from the lower region of said solvent extraction zone to the upper region of a solvent stripping zone, withdrawing from said solvent stripping zone a volatile fraction, passing said withdrawn volatile fraction from said solvent stripping zone as reflux to said solvent extraction zone, and withdrawing from an intermediate region of said solvent stripping zone an intermediate volatile product stream containing said intermediate fraction.

References Cited by the Examiner

UNITED STATES PATENTS

| | | | |
|---|---|---|---|
| 2,925,452 | 2/60 | Broughton | 260—681.5 |
| 2,982,795 | 5/61 | Owen | 260—681.5 |
| 3,038,016 | 6/62 | Hachmuth | 260—681.5 |

ALPHONSO D. SULLIVAN, *Primary Examiner.*